No. 652,211. Patented June 19, 1900.
J. W. HAYS.
NEST FOR POULTRY.
(Application filed June 20, 1899.)
(No Model.) 2 Sheets—Sheet 1.
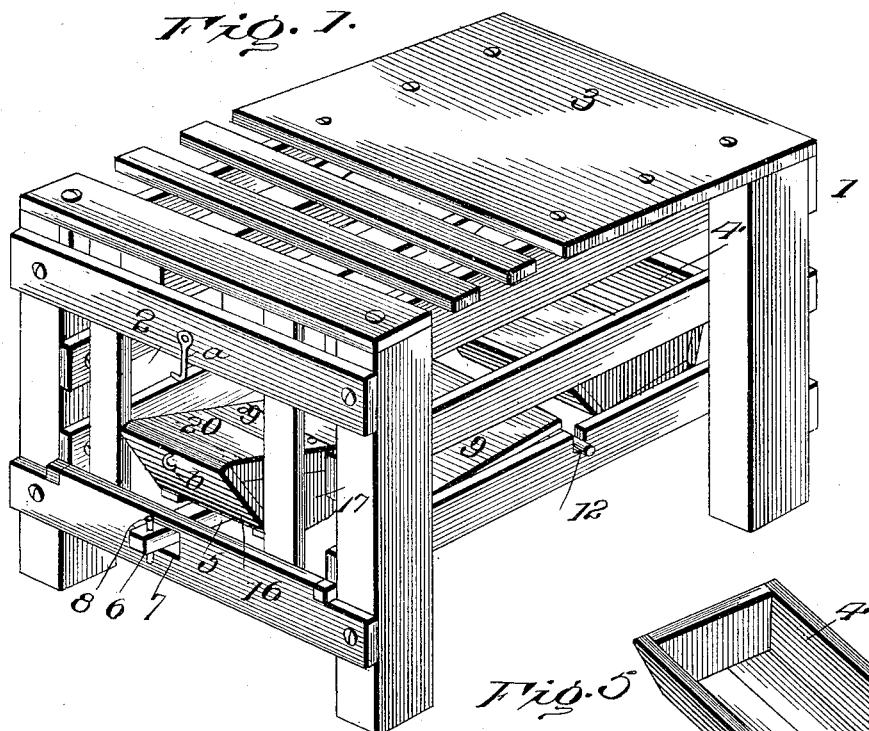

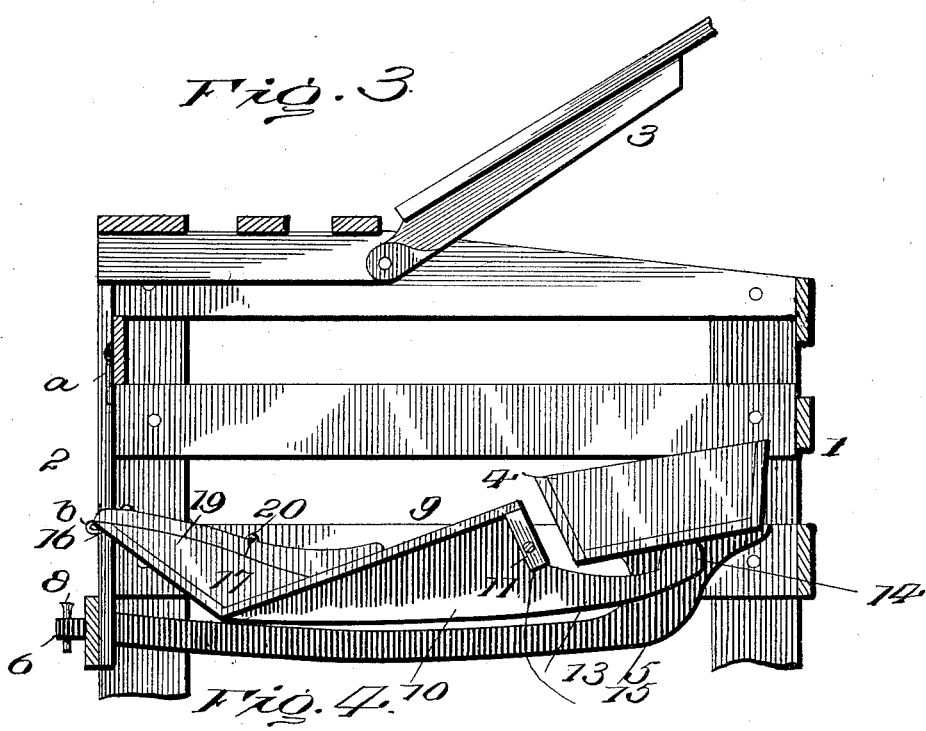

UNITED STATES PATENT OFFICE.

JOHN W. HAYS, OF OKLAHOMA, OKLAHOMA TERRITORY, ASSIGNOR OF THREE-FOURTHS TO J. H. MARKWELL AND WALLACE MARKWELL, OF SAME PLACE.

NEST FOR POULTRY.

SPECIFICATION forming part of Letters Patent No. 652,211, dated June 19, 1900.

Application filed June 20, 1899. Serial No. 721,235. (No model.)

*To all whom it may concern:*

Be it known that I, JOHN W. HAYS, a citizen of the United States, residing at Oklahoma city, in the county of Oklahoma, Oklahoma Territory, have invented certain new and useful Improvements in Nests for Poultry; and I do hereby declare the following to be a full, clear, and exact description of the invention, such as will enable others skilled in the art to which it appertains to make and use the same.

This invention has relation to nests for poultry, and has for its objects to prevent a sitting hen being interfered with by other hens; to obviate the breaking of the eggs by two hens getting upon the nest at the same time; to preclude forming the habit of egg-eating by the poultry, due, primarily, to the breaking of the eggs through interference; to enable a sitting hen to seclude herself when required, and, finally, to insure cleanliness.

Other objects and advantages result from the special formation of the contrivance and will suggest themselves to persons versed in the culture of poultry as the details of the invention are fully comprehended and understood.

For a full description of the invention and the merits thereof and also to acquire a knowledge of the details of construction of the means for effecting the result, reference is to be had to the following description and the drawings hereto attached.

While the essential and characteristic features of the invention are necessarily susceptible of modification, still the preferred embodiment is illustrated in the accompanying drawings, in which—

Figure 1 is a perspective view of a device constructed in accordance with and embodying the essential features of the invention. Fig. 2 is a view of the device inverted. Fig. 3 is an elevation, the near side being omitted and the top door open. Fig. 4 is a longitudinal section on the line X X of Fig. 2, showing the relation of the parts when the front door is closed. Fig. 5 is a detail perspective view of the nest and its arm. Fig. 6 is a detail view of the tilting platform and weight-box.

Corresponding and like parts are referred to in the following description and indicated in all the views of the drawings by the same reference characters.

The device comprises an inclosure in the form of a house or coop, the inclosing sides or walls being composed of slats which are spaced apart for the purpose of ventilation and the admission of light, besides providing a structure easily portable and readily accessible for the purpose of inspection and cleaning. The framework or coop 1 is provided in its front end with a door-opening 2 and in its top side with an opening closed by a door 3, which is hinged to swing upwardly and forwardly at its free end. This door is located at the rear end of the coop and directly over the nest and serves the double purpose of protecting said nest from rain and admitting of access to the nest for the removal of the eggs laid therein.

The nest 4 is a shallow tray having its front and rear walls upwardly divergent and is of a length to extend from one side wall of the coop to the other without touching either. An arm 5 is secured centrally to the bottom of the nest 4 and extends forwardly, its front end being reduced, as shown at 6, and passing through an opening 7 in a cross-slat of the coop below the door-opening 2. A pin or key 8 passes through the projecting terminal of the reduced end 6 and prevents rearward displacement of the arm. The shoulder at the base of the reduced end 6 engages with the inner side of the said cross-slat and the pin 8 comes in contact with the front side of said slat and the two jointly prevent longitudinal movement of the arm and nest.

The tilting platform 9 is located in advance of the nest and is supported by means of longitudinally-disposed sills 10, secured intermediate of their ends to a cross-beam 11, having its end portions reduced and forming journals, which obtain bearings in notches 12, formed in the upper edge of transversely-alining side slats. The longitudinal sills have the lower edges of their front portions curving upwardly and forwardly, whereby the front ends of said sills are tapering, and the rear portions of said sills are reduced, forming arms 13, which extend beneath the nest 4 upon opposite sides of the arm 5 and terminate in rests 14, disposed to engage with the beam of the nest on a line about midway between the front and rear walls thereof. The rests 14 are half-round projections, which have a rocking engagement with the nest, due to the tilting of the sills 10 in the operation of the device. The vertical shoulders 15, formed at the bases of the arms 13, receive the cross-beam 11, which is secured thereto. The platform 9 is approximately of wedge form and is disposed with its smaller end facing the door-opening 2, the wider end being attached to the top edge of the cross-beam 11, which is in the plane of the upper edges of the forward portions of the longitudinal sills 10. The platform 9 constitutes an approach to the nest and is weighted so as to normally hold the nest elevated and the door 16 open or depressed.

A box 17 is applied to the front end of the tilting platform and is adapted to receive weights 18 for counterbalancing the nest and the eggs laid therein, so as to hold the door 16 in such a position as to uncover the opening 2. This box is formed of triangular-shaped side pieces 19, a front wall constituting the door 16, and a sectional top 20, the front section being removable, so as to admit of access to the box for placing additional weights therein or removing some of the weights therefrom. The side pieces 19 brace the front wall or door 16 and support the top 20, which constitutes an approach to the nest. The door or front wall 16 inclines upwardly and forwardly and is adapted to prevent ingress through the door-opening 2 when the nest is depressed by the weight of the hen perched thereon.

The parts are disposed so as to be readily removed for the purpose of cleaning or making repairs. Upon withdrawing the pin or key 8 from the reduced end 6 of the arm 5 the nest can be lifted through the top opening closed by the door 3. The tilting platform can likewise be readily removed, since the journals of the cross-beam 11 rest in open bearings 12. The parts can be easily placed in position by an operation the reverse of that practiced in their removal.

When the device is in working order and prime condition, the nest is elevated and the entrance end of the approach depressed. When a hen passes through the door-opening 2 and perches upon the nest, the latter is depressed and the door 16 correspondingly elevated, thereby closing the door-opening 2 and preventing another hen from entering the coop or structure. As the hen leaves the nest and steps upon the platform 9 the latter will descend and uncover the door-opening 2 and permit the hen to have free exit. At the same time that the front end of the platform lowers the nest will correspondingly rise, thereby setting the device for the next hen, as will be readily understood. The eggs are removed from the nest through the opening closed by the door 3, as previously stated.

It sometimes happens that a sitting hen will not remain upon the nest at the beginning of the hatching operation, and in order to prevent exit the door is fastened when the hen is on the nest, a hook $a$ and an eye $b$ being provided for the purpose. The weight-box is utilized for the reception of feed and drink. After the hen has become accustomed to remaining upon the nest the door is released, so she may have free egress and ingress.

Having thus described the invention, what is claimed as new is—

1. In a device of the character described, an inclosing framework, a vertically-movable nest, an arm secured at one end to the nest and having its opposite end movably connected to the framework, a tilting platform mounted independently of the nest, and supporting-arms projecting in the rear of the platform and beneath the nest.

2. In combination, an inclosing framework having a door-opening, a nest, an arm secured at one end to the nest and having its opposite end loosely and detachably connected with the framework, a tilting platform mounted independent of the nest, longitudinal sills supporting the platform and having their rear ends extended beneath the nest and terminating in rests, and a door applied to the front end of the platform for closing the aforesaid door-opening when the nest is depressed.

3. An inclosing structure of open framework having a door-opening in its front and a door-controlled opening in its top side, a nest located below the door-controlled opening in the top of the structure, an arm projecting from the nest and having loose and detachable connection with the framework, longitudinal sills having their rear ends reduced to form arms which project beneath the nest and terminate in rounded rests, a cross-beam applied to the sills and obtaining bearings at its ends in notches in transversely-alining slats of the framework, a platform applied to the front end portion of the longitudinal sills, and a box applied to the platform, the front wall of the box forming a door for the opening in the front of the structure, substantially as specified.

In testimony whereof I affix my signature in presence of two witnesses.

JOHN W. HAYS. [L. S.]

Witnesses:
J. H. ROLLINS,
J. H. MARKWELL.